United States Patent [19]

Toganoh et al.

[11] Patent Number: 4,694,307

[45] Date of Patent: Sep. 15, 1987

[54] RECORDING DEVICE WITH MULTIPLE RECORDING UNITS AND A COMMON INK SOURCE

[75] Inventors: Shigeo Toganoh; Yohji Matsufuji; Hiroo Ichihashi, all of Tokyo, Japan

[73] Assignee: Canon Kabushiki Kaisha, Tokyo, Japan

[21] Appl. No.: 873,837

[22] Filed: Jun. 9, 1986

Related U.S. Application Data

[63] Continuation of Ser. No. 752,474, Jul. 3, 1985, abandoned, which is a continuation of Ser. No. 419,515, Sep. 17, 1982, abandoned.

[30] Foreign Application Priority Data

Oct. 2, 1981 [JP] Japan ............................... 56-157296
Oct. 2, 1981 [JP] Japan ............................... 56-157303

[51] Int. Cl.[4] .......................... G01D 15/16; B41J 3/54

[52] U.S. Cl. ................................. 346/140 R; 400/71; 400/82; 400/126

[58] Field of Search ............ 346/140 PD, 75; 400/71, 400/82, 126; 355/14 SH, 46

[56] References Cited

U.S. PATENT DOCUMENTS

| | | | |
|---|---|---|---|
| 2,451,288 | 10/1948 | Huebner | 346/140 PD |
| 3,787,884 | 1/1974 | Demer | 346/75 |
| 3,911,818 | 10/1975 | MacIlvaine | 400/126 |
| 4,064,513 | 12/1977 | Skala | 346/75 |
| 4,152,710 | 5/1979 | Matsuba | 346/75 |
| 4,170,016 | 10/1979 | Geil | 346/140 PD |
| 4,223,323 | 9/1980 | Bader et al. | 346/140 |
| 4,296,421 | 10/1981 | Hara | 346/140 PD |
| 4,300,145 | 11/1981 | Raamsdonk | 346/140 PD |
| 4,340,896 | 7/1982 | Cruz-Uribe et al. | 346/140 |
| 4,385,304 | 5/1983 | Sniderman | 346/75 |
| 4,520,373 | 5/1985 | Ayata | 346/140 PD |

FOREIGN PATENT DOCUMENTS

| | | | |
|---|---|---|---|
| 56-56899 | 5/1981 | Japan | 400/82 |

*Primary Examiner*—E. A. Goldberg
*Assistant Examiner*—Mark Reinhart
*Attorney, Agent, or Firm*—Fitzpatrick, Cella, Harper & Scinto

[57] ABSTRACT

A recording device comprises a plurality of ink-jet recording units arranged separately from each other and an ink reservoir to supply an ink commonly to the recording units.

1 Claim, 4 Drawing Figures

RECORDING DEVICE WITH MULTIPLE RECORDING UNITS AND A COMMON INK SOURCE

This application is a continuation of application Ser. No. 752,474 filed July 3, 1985, abandoned, which is a continuation of application Ser. No. 419,515, filed Sept. 17, 1982, now abandoned.

BACKGROUND OF THE INVENTION

1. Field of the Invention

This invention relates to a device for recording images on paper or similar recording material and more particularly relates to a recording device having a plurality of recording units.

2. Description of the Prior Art

There are a variety of recording devices including electrophotographic copying machines, ink-jet recording machines, etc. When plural copies are produced from a document or a piece of information, these recording devices need to repeat the same recording operation the same number of times as the number of copies required. In other words, the time required for recording is the product of the time required for recording one copy and the number of copies required.

SUMMARY OF THE INVENTION

The object of this invention is to provide a recording device improved with respect to the foregoing, and more specifically it is to provide a recording device having a plurality of recording units for reducing the time for recording a given number of plural copies to a great extent.

According to the present invention, there is provided a recording device which comprises a plurality of ink-jet recording units arranged separately from each other and an ink reservoir to supply an ink commonly to the recording units.

According to another aspect of the present invention, there is provided a recording device which comprises a plurality of ink-jet recording units arranged separately from each other. Said recording units are provided each with an ink feeder and said recording device is provided with a supply system for delivering ink to all the ink feeders.

DESCRIPTION OF THE PREFERRED EMBODIMENTS

Figure 1:
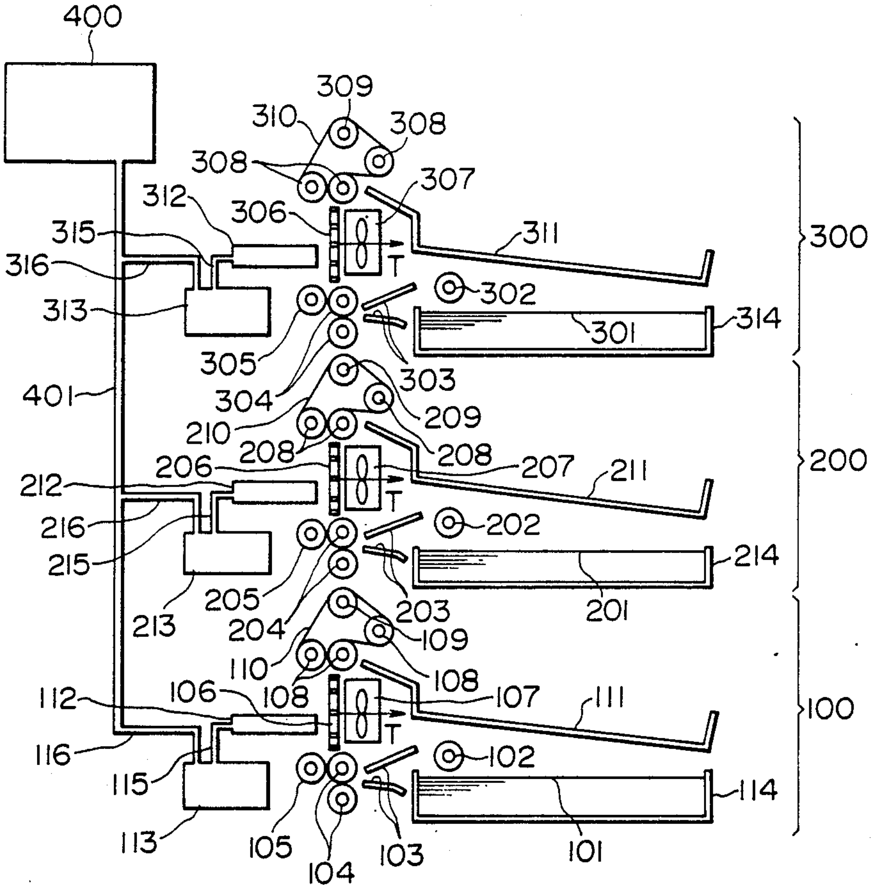
FIG. 1 is a schematic view of the constitutional a preferred embodiment of this invention.

Referring now to the drawings, this invention will be described in detail.

In FIG. 1, generally illustrating the construction of an embodiment of this invention; 100, 200 and 300 are recording units, constructed nearly in the same manner, having respective recorder heads 112, 212 and 312. Each recorder head is provided with ink-jet nozzles of the full line type (not illustrated), as recording elements, aligned in the direction perpendicular to the drawing plane. The recorder heads 112, 212 and 312 are driven in response to electric signals sent from an information source (not illustrated). Ink feeders 113, 213 and 313 communicate with the recorder heads 112, 212 and 312, respectively through respective ink feed pipes 115, 215 and 315. Ink in an ink reservoir 400 is supplied to the ink feeders 113, 213 and 313 through a main pipe 401 and respective branch pipes 116, 216 and 316. The number of the recording units is optional.

In the recording paper supply and take-off system; 101, 201 and 301 are sheets of recording paper stacked in recording paper cassettes 114, 214 and 314, respectively; 102, 202 and 302 are paper-feeding rollers; 103, 203 and 303 are guide plates for recording paper; 104, 204 and 304 are pairs of resist rollers; 105, 205 and 305 are the first transport rolls; 106, 206 and 306 are platens having numerous fine perforations; 107, 207 and 307 are fans; 108, 208 and 308 are the second transport rolls; 109, 209 and 309 are tension rolls; 110, 210 and 310 are transport belts; and 111, 211 and 311 are trays for receiving discharged paper.

The manner of operation of the recording device having the above-mentioned construction is illustrated below referring to the recording unit 100 alone since the recording units 100, 200 and 300 operate for recording in almost the same manner.

A sheet of recording paper (the uppermost sheet) stacked in the recording paper cassette 114 is sent by revolution of the paper-feeding roller 102, along the guide plate 103 to the pair of resist rollers 104 standing without revolution. With revolution of the resist rollers 104, the recording paper is held between one of the resist rollers 104 and the first transport roll 105 to move toward the space between the recorder head 112 and the perforated platen 106, where the recording paper is drawn by the rotating fan 107 toward the platen 106 (in the direction of arrow T). Thus, the recording paper passes the first transport roll 105 and moves along the platen 106 to the second transport roll 108 while drawn against the platen by the fan 107.

The recorder head 112, driven in response to electric signals from an information source, ejects ink droplets to record the information on the recording paper moving along the platen 106.

After the recording, the recording paper is transferred, and the front end of the paper contacts the second transport rolls 108 and is then nipped with the rolls. Thus the recording paper is discharged through the transport belt 110 to the tray 111.

Figure 2:
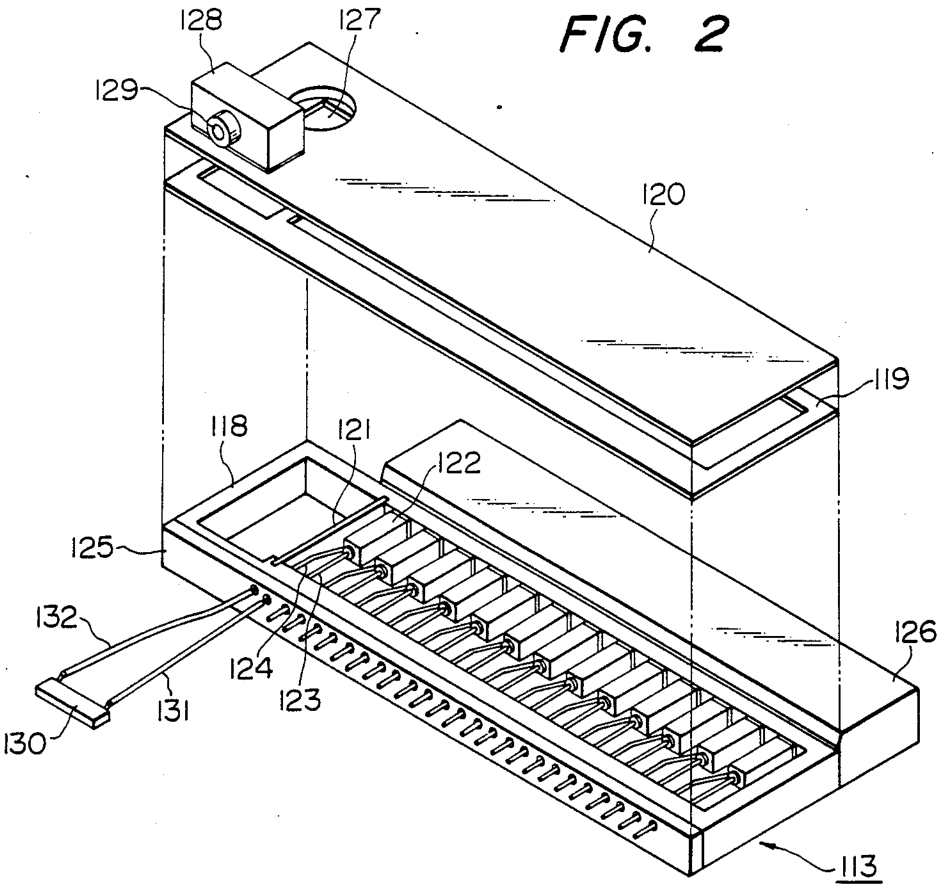
FIGS. 2, 3 and 4 are an exploded view and cross-sectional views for illustrating detailed partial structures of the embodiment shown in FIG. 1.

FIG. 2 is an exploded view illustrating the details of structure of the ink feeder in the recording unit 100 shown in FIG. 1. The ink feeder 113 comprises an ink tank 118, packing 119, and a top cover 120. The body of the ink tank 118 is equipped with a filter 121, a plurality of check valves 122, and the same number of pairs of ink-feeding pipes 123 and 124. Further, a pipe guide 125 and a cylinder block 126 are attached to the front side wall and rear side wall, respectively, of the ink tank body 118. An ink injection port 127 is located in the top cover 120 and a vent hole block 128 with a filter block 129 attached thereto is mounted on the top cover 120.

The top cover 120 with the packing 119 is fastened to the ink tank body 118 by means such as screws or adhesives. When adhesives are used, the packing 119 is not always necessary. A multi-nozzle ink-jet recorder head 130 is connected to the ink-feeding pipes 123 and 124 through ink-feeding tubes 131 and 132 to be fed with ink from the ink feeder 113. When a plurality of the multi-nozzle ink-jet recorder heads are arranged, a full line type of ink-jet recording unit is provided.

Figure 3:
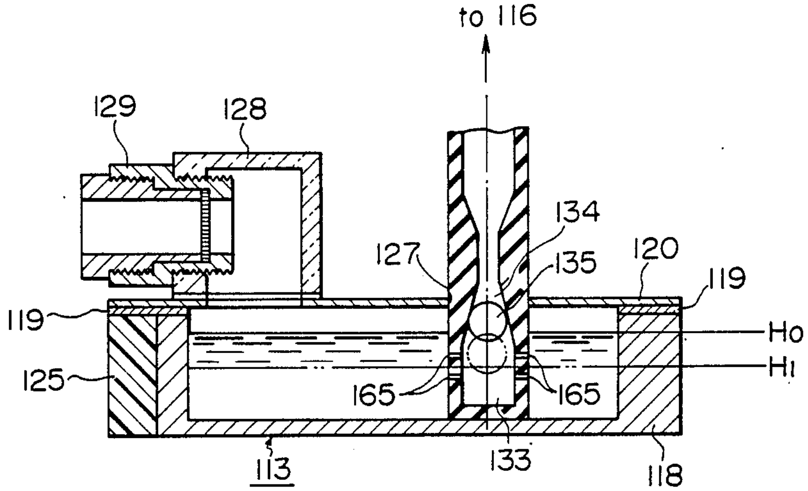

The ink supply from the ink feeder 113 to the multi-nozzle heads 130 is effected as follows:

In the first place, prior to the supply to the heads 130, ink is supplied to the ink feeder 113 from the ink reservoir 400 (FIG. 1) through the branch pipe 116 and a liquid level control valve 133 fitted into the ink injection port 127 as shown in FIG. 3. It may be noted that the ink reservoir 400 (FIG. 1) is provided with a vent hole and the branch pipe 116 is equipped with a stop valve, as required (both not illustrated). As shown in FIG. 3, the liquid level control valve 133 is a cylinder having several outlets 165 for ink in the cylinder wall. Its inner cylindrical cross-section is narrower upward of its lowermost extreme and contains a ball 135 below the narrowed section. Thus, when the ink level in the ink feeder 113 is lower than $H_0$ (for example, the ink level is at $H_1$), the ball 135 descends to allow the ink to flow down through the gap formed between the ball 135 and the inner wall of the valve 133. As the ink level rises due to the flow of the ink, the ball 135 ascends, and completely closes said narrowed section when the ink level reaches $H_0$, thereby stopping the down flow of the ink.

Figure 4:
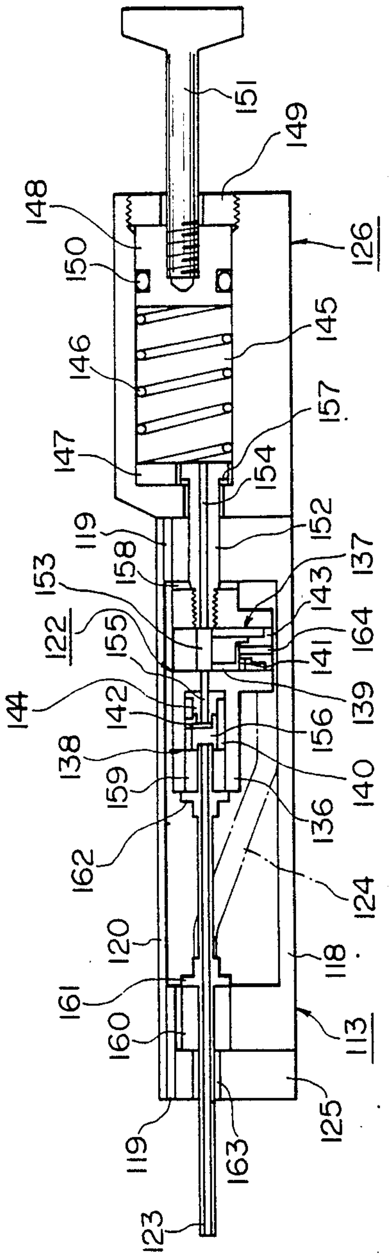

The ink is fed from the ink feeder 113 into the multi-nozzle heads 130 while keeping the ink level at $H_0$ in the above-mentioned way. FIG. 4 is a cross-sectional view taken along the shorter side line of the ink feeder 113 shown in FIG. 2. As shown in FIG. 4, 119 and 120 denote a packing and a top cover, respectively, and the check valve 122 set up in the ink feeder 113 consists mainly of a check elbow 136 and two backflow check valve units 137 and 138 which are arranged perpendicularly in the elbow and comprise valve holders 139 and 140, valves 141 and 142 and valve seats 143 and 144.

In a cylinder block 126, a spring 146, the spring receiver 147, and a piston 148 are inserted in a cylinder 145 which is closed at the release side end with a cylinder closure 149. An O-ring 150 and a removable rod 151 are attached to the piston 148. Said check valves 122 and cylinders 145 are installed corresponding to the prescribed number of the foregoing multi-nozzle ink-jet recorder heads of full line type shown in FIG. 2. The cylinder 145 is set up in the cylinder block 126 which has been formed into a single body for the purpose of providing sufficient mechanical strength. Cylinder 145 communicates with an ink path 153 positioned between the two backflow check valve units 137 and 138, through a joint 152. Ink leakage-preventing packings 157 and 158 are interposed in the joint sections of the joint 152.

In FIG. 4, 123 is an ink-feeding pipe 123 shown in FIG. 2, to be connected to an ink-feeding tube 131, and is fastened to the check valve 122 and the ink tank body 118 through supporting members 159 and 160, respectively. Further, sleeves 161 and 162 are attached to the pipe 123 particularly for the purpose of preventing the movement of the pipe due to connection or disconnection of the ink-feeding tube. A pipe guide 125 prevents the supporting member 160 from falling off, to ensure the fastening of the ink-feeding pipe 123. A sealant filling up a gap present at a hole 163 for passing the ink-feeding pipe 123 can prevent leakage of ink through the gap.

When the piston 148 is pushed to the left in FIG. 4 by means of the rod 151 under the condition that the ink feeder 113 is filled with the ink, the air in the cylinder 145 runs through paths 154, 153 and 155 to release the valve 142 and is discharged through a path 156 and the ink-feeding pipe 123. When the pressure applied to the piston 148 is released, the piston 148 is pushed back to the right in FIG. 4 by the spring 146, the valve 142 is shut and the valve 141 is released, by the suction force caused in the cylinder 145, and ink is introduced into the cylinder 145 through paths 164, 153 and 154. Then, the piston 148 is pushed again to the left to shut the valve 141 and release the valve 142, and the ink sucked into the cylinder 145 runs through the paths 154, 153, 155 and 156, and the ink-feeding pipe 123 and tube 131 (FIG. 2) to be fed into the ink-jet recorder head 130 (FIG. 2). The initial supply of ink from the ink feeder 113 to the ink-jet recorder head 130 (FIG. 2) is conducted in this way until ink fills ink-feeding pipe 123, ink-feeding tube 131 and ink-jet recorder head 130 and further air is expelled from ink-feeding tube 132, and ink-feeding pipe 124 with the ink-jet recorder head 130 finally communicating with the ink feeder 113. For the purpose of ensuring the actions of the backflow check valve units 137 and 138 to prevent the ink leakage due to a back pressure, the areas of valve seats 143 and 144 contacting the valves 141 and 142, respectively, are smaller than the areas of valves 141 and 142 and form the same plane as the valves 141 and 142.

Each path 154 is located at a position lower than the center of the corresponding cylinder 145 so that the air remaining in the cylinder 145 may not enter the path 154 by operation of the piston 148.

The supply of ink to each recorder head 130 during its operation for discharging ink droplets is effected through the two feed lines of the ink-feeding pipe 123 and tube 131 and of the ink-feeding pipe 124 and tube 132 connecting the feeder 113 and the head 130, by virtue of their capillary action. Accordingly, the backflow check valve units 137 and 138 are designed to open with minute pressure. In addition, the ink supply is secured through another route not passing through the check valve 122 even if the backflow check valve units 137 and 138 do not work well.

When the ink level in the ink feeder 113 falls below $H_0$, the liquid level control valve 133 is opened as illustrated in FIG. 3, thereby keeping the level constant around $H_0$.

For other recording units 200 and 300, the automatic supply of ink is performed in the same manner as illustrated above. Accordingly, it is unnecessary to install a means of indicating the residual amount of ink or warning means in each recording unit, provided that a means of indicating the residual amount of ink is installed in the ink reservoir 400 alone.

For supplying ink when the ink in the ink reservoir 400 is used up, the vacant reservoir 400 may be replaced with another reservoir filled with ink or ink maybe fed to the vacant reservoir.

As described hereinbefore in detail, the recording device of this invention is provided with a plurality of recording units constructed in accordance with almost the same specifications, thus permitting a reduction in the time required for recording a given number of plural copies.

In the recording device of this invention, ink is supplied to a plurality of recording units from a single source, thus simplifying the operation of exchanging ink reservoirs as well as reducing the frequency of this exchange.

Furthermore, according to the present invention, the ink is fed from a single feeding source to a plurality of recording portions by using a distribution feeding system. Therefore, a proper amount of ink can be simultaneously and automatically supplied to the recording portions corresponding to the consumption of ink.

What we claim is:

1. A recording device comprising:

a plurality of ink-jet recording units arranged separately from each other, each of said recording units including a plurality of multi-nozzle ink-jet recorder heads having aligned nozzles;

a plurality of ink feeders, each corresponding to one of said recording units, for supplying ink to said recorder heads of said corresponding recording unit;

a single main ink reservoir for containing ink; and means for supplying ink from said single main ink reservoir to all of said ink feeders.

* * * * *